UNITED STATES PATENT OFFICE.

AUGUST KIESELE, OF NEW YORK, N. Y.

IMPROVEMENT IN COMPOSITIONS FOR CASTING ORNAMENTAL FIGURES.

Specification forming part of Letters Patent No. 215,757, dated May 27, 1879; application filed October 26, 1878.

*To all whom it may concern:*

Be it known that I, AUGUST KIESELE, of New York city, county and State of New York, have invented an Improved Composition for Casting Ornamental Figures, of which the following is a specification.

This invention relates to a new composition for casting ornamental figures; and consists in the mixture of starch with paraffine, as is hereinafter more fully described.

In carrying my invention into effect, I mix about five parts of paraffine with two parts of starch. This mixture is melted and thoroughly stirred until it is in the proper condition for being poured into the molds. In the molds it is allowed to cool, and is then removed and ready for use.

The paraffine serves to give the proper body and consistency to the mixture, while the starch gives a beautiful translucency to the finished article, and is not injuriously affected by moisture.

In place of, or together with, the paraffine, I may use stearine or spermaceti, which, for the purposes of this invention, are equivalents of the paraffine, as they are white, wax-like, and readily fusible, and only differ from the same in melting at a different degree of heat.

I am aware that previous to my invention a composition of stearine and terra-alba has been known; but the terra-alba does not impart to the composition the peculiar translucency which I obtain by the use of starch, and which it is the object of this invention to produce.

I do not claim to have invented the composition of stearine and terra-alba; but

I do claim—

The composition for casting composed of paraffine and starch, substantially as specified.

AUGUST KIESELE.

Witnesses:
T. B. MOSHER,
F. V. BRIESEN.